United States Patent
Lambourn et al.

(10) Patent No.: US 7,529,873 B2
(45) Date of Patent: *May 5, 2009

(54) DETERMINATION OF ACCESS RIGHTS TO INFORMATION TECHNOLOGY RESOURCES

(75) Inventors: Simon Keith Lambourn, Middlesex (GB); Andrew David Missen, West Yorkshire (GB); William Bruce Morgan, Hampshire (GB); Marian Morgan, legal representative, Fareham (GB); Guy Iain Tarrant Sidford, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/044,131

(22) Filed: Mar. 7, 2008

(65) Prior Publication Data

US 2008/0155687 A1    Jun. 26, 2008

Related U.S. Application Data

(63) Continuation of application No. 11/239,322, filed on Sep. 29, 2005, now Pat. No. 7,366,812.

(30) Foreign Application Priority Data

Nov. 13, 2004    (GB)    ................................ 0425113.8

(51) Int. Cl.
*G06F 13/14*    (2006.01)
*G06F 15/16*    (2006.01)

(52) U.S. Cl. .................. 710/240; 710/244; 710/42; 718/104; 709/217

(58) Field of Classification Search ......... 710/240–244, 710/112, 39–42; 718/102–104; 709/217–219; 713/182

See application file for complete search history.

(56) References Cited

U.S. PATENT DOCUMENTS

| 5,784,463 | A | 7/1998 | Chen et al. |
|---|---|---|---|
| 6,219,790 | B1 | 4/2001 | Lloyd et al. |
| 6,339,826 | B2 | 1/2002 | Hayes, Jr. et al. |
| 6,389,543 | B1 | 5/2002 | Dawson et al. |
| 7,171,667 | B2 * | 1/2007 | Libby .......................... 718/104 |
| 2002/0120868 | A1 | 8/2002 | Hay |
| 2003/0061482 | A1 | 3/2003 | Emmerichs |
| 2003/0191971 | A1 | 10/2003 | Klensin et al. |
| 2005/0246547 | A1 * | 11/2005 | Oswald et al. .............. 713/182 |

FOREIGN PATENT DOCUMENTS

EP    1381199 A1    7/2002

* cited by examiner

*Primary Examiner*—Raymond N Phan
(74) *Attorney, Agent, or Firm*—Schmeiser, Olsen & Watts; William H. Steinberg

(57) ABSTRACT

A system and firewall for controlling access to resources within an information technology system. Commands received from a requesting entity request access to a resource associated with each command. An assigned authority level of the requesting entity is identified. At least one required authority level of the requesting entity is determined for each command as a function of each command and a resource criticality classification of the resource associated with each command. The requesting entity is granted or denied the requested access to the resource associated with each command if a determination has been made that each condition of at least one specified condition has or has not been satisfied, respectively. The at least one specified condition is specific to each command and includes a condition of the assigned authority level matching or exceeding an authority level of the at least one required authority level of each command.

24 Claims, 5 Drawing Sheets

DETERMINATION OF ACCESS RIGHTS TO INFORMATION TECHNOLOGY RESOURCES

This application is a continuation application claiming priority to Ser. No. 11/239,322, filed Sep. 29, 2005.

BACKGROUND OF THE INVENTION

1. Technical Field

The invention relates to the field of information technology (IT) management systems and in particular to a method and system for determining access rights to IT resources.

2. Related Art

A large proportion of failures of information technology (IT) systems are caused by operator error. Operator error often occurs because the operator enters an incorrect command into the system. This problem is compounded by IT systems becoming more complex, with often, hundreds of components to manage. These components may comprise network components, servers, peripherals, software applications, desktop computers and many other devices. As a business's dependency on IT systems increase, the malfunction of an IT system may have a high impact on the way in which a business can perform its business functions.

As IT systems become more reliable, operators have less frequent involvement in any one specific system and the operator's activities are often spread across many IT systems. Hence, an operator is not able to develop knowledge of any one particular IT system. Further, it is not feasible in a business environment to maintain an in-depth knowledge of one particular IT system which may not be used frequently. A rising pressure on business costs is leading to a work environment in which shared groups of operators are managing large and complex IT systems, which in turn increases the probability of operator input error.

Today, the above problems are managed by a combination of carefully trained staff and an investment in operational procedures. Where ever possible automated responses are used to eliminate the need for operator intervention. However when operator intervention is needed, neither of the above techniques are very satisfactory because for a business they increase costs.

An additional problem is created by regulatory frameworks, such as, FDA, which require each operational staff working on regulated systems to be trained and certified as competent to use the regulated system.

European patent application EP1 381 199 A1 discloses a firewall for dynamically granting and denying network resources. EP1 381 199 A1 relates to a personalized access policy server with respect to user's grants and with respect to already accessed resources. A method is disclosed for providing dynamically defined limited Internet access from a user's terminal, wherein a portal server provides a portal website with portal information identifying the set of accessible resources.

A disadvantage of EP1 381 199 A1 is that although, EP1 381 199 A1 dynamically controls access to network resources, it does not address the problem of access rights to specific commands once access has been given to a network resource.

Therefore there is a need to provide a method and a system which alleviates the above aforementioned problems.

SUMMARY OF THE INVENTION

The present invention provides a method for controlling access to resources within an information technology (IT) system in conjunction with executing a procedure that defines a plurality of commands, said method comprising:

receiving the plurality of commands from a requesting entity, each command requesting access to an associated resource in order to perform a function;

identifying an assigned authority level of the requesting entity;

determining at least one required authority level of the requesting entity for each command in order for the requesting entity to be granted access to the requested resource associated with said each command, said at least one required authority level for each command being determined as a function of said each command and a resource criticality classification of the resource associated with said each command;

granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

denying the requesting entity said requested access if a determination has been made that each condition of said at least one specified condition has not been satisfied.

The present invention provides a computer program product loadable into an internal memory of a digital computer, said computer program product comprising software code adapted be executed on said digital computer to perform a method for controlling access to resources within an information technology (IT) system in conjunction with executing a procedure that defines a plurality of commands, said method comprising:

receiving the plurality of commands from a requesting entity, each command requesting access to an associated resource in order to perform a function;

identifying an assigned authority level of the requesting entity;

determining at least one required authority level of the requesting entity for each command in order for the requesting entity to be granted access to the requested resource associated with said each command, said at least one required authority level for each command being determined as a function of said each command and a resource criticality classification of the resource associated with said each command;

granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

denying the requesting entity said requested access if a determination has been made that each condition of said at least one specified condition has not been satisfied.

The present invention provides a computer system for controlling access to resources within an information technology (IT) system in conjunction with executing a procedure that defines a plurality of commands, said computer system comprising internal memory that stores software code therein, wherein execution of said software code by said computer system implements a method comprising:

receiving the plurality of commands from a requesting entity, each command requesting access to an associated resource in order to perform a function;

identifying an assigned authority level of the requesting entity;

determining at least one required authority level of the requesting entity for each command in order for the requesting entity to be granted access to the requested resource associated with said each command, said at least one required authority level for each command being determined as a function of said each command and a resource criticality classification of the resource associated with said each command;

granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

denying the requesting entity said requested access if a determination has been made that each condition of said at least one specified condition has not been satisfied.

The present invention provides an operational firewall for controlling access to resources within an information technology (IT) system in conjunction with executing a procedure that defines a plurality of commands, said operational firewall comprising:

a procedure manager for receiving the plurality of commands from a requesting entity, each command requesting access to an associated resource in order to perform a function;

a context manager for identifying an assigned authority level of the requesting entity;

a controller component for determining at least one required authority level of the requesting entity for each command in order for the requesting entity to be granted access to the requested resource associated with said each command, said at least one required authority level for each command being determined as a function of said each command and a resource criticality classification of the resource associated with said each command;

the context manager adapted to grant the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

the context manager adapted to deny the requesting entity said requested access if a determination has been made that each condition of said at least one specified condition has not been satisfied.

DETAILED DESCRIPTION OF THE INVENTION

Figure 1:
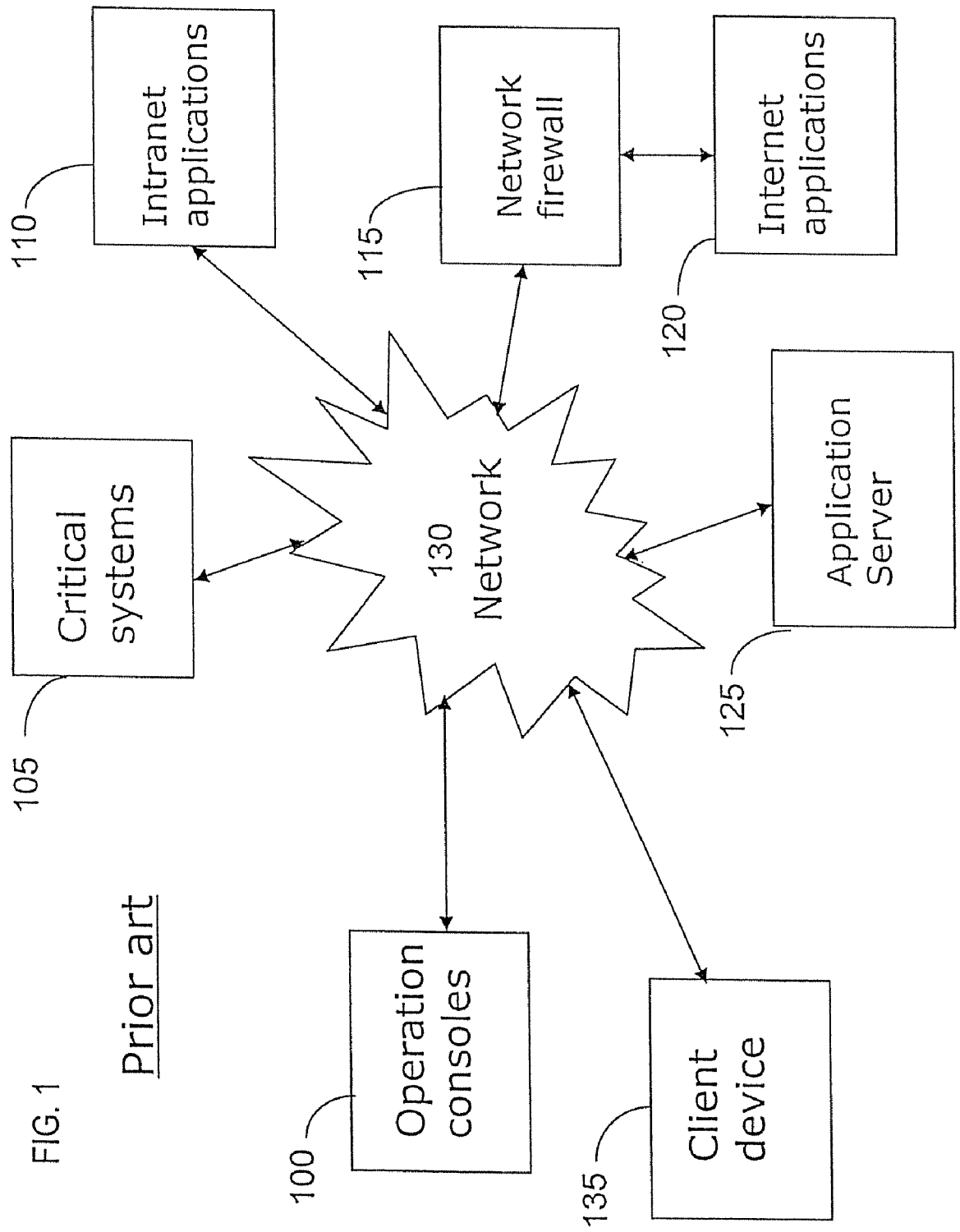
FIG. 1 shows a prior art schematic illustration of an information technology (IT) infrastructure that embodies many business's IT infrastructure, in accordance with embodiments of the present invention.

The present invention discloses an operational firewall that controls access to resources within an information technology (IT) system. The IT system receives a plurality of commands from a requesting entity and each command requests access to a resource in order to perform a function as defined by a procedure. The operational firewall, for each received command, determines a relationship between: the received command, an identified characteristic of the received command, and the requested resource. In response to the relationship being determined, a status is assigned to the command and a determination is made as to whether the requesting entity has an appropriate level of authority in order to perform the command on the resource. If the requesting entity does not have an appropriate level of authority, access is denied to the requested resource and an alternative command to be performed may be suggested.

The present invention provides a method for controlling access to resources within an IT system, the IT system receiving a plurality of commands from a requesting entity, each command requesting access to a resource in order to perform a function, the method comprising the steps of: identifying an authority level for the requesting entity; determining at least one characteristic for each of the received commands; for each received command, determining a relationship between the received command, its determined characteristic and the requested resource, to determine the effect of the received command being performed on the resource; assigning a status to the received command, in dependence of the effect of performing the received command on the requested resource being determined; comparing the identified authority level with the assigned status of the command to determine whether the requesting entity has an appropriate authority level to perform the function requested by the received command; and in dependence of the comparing step, granting or denying access to the requested resource.

The present invention improves upon existing hard-coded mechanisms of restricting user access to resources by providing a dynamic security abstraction layer between resources and an operation consoles, whereby an operator's level of security and entitlement to perform actions will vary based on a number of parameters, and will vary at different stages during a requested procedure.

The present invention allows an operator to enter commands into an operational console in order to carry out a number of tasks that formulate a procedure on one or more resources. The present invention provides a secure environment in which an operator can only perform tasks in which the operator is authorized. For example, if a command is received to shut down a server, a determination is made to identifying the operator's authorization level, the type of command, i.e. does the command of shutting down the server have a high level of risk associated with it and what commands have already been tried before. Once the relationship between these variables has been determined, a status is assigned to the command. The status is assigned to the command for this instance only. For example, when another command in received, the previous commands and their characteristics are taken into consideration, thus each time a command is received it may be assigned a different status, which in turn effects whether or not access is granted or denied to the resource.

The method provides that when denying access to the resource, an alert may be generated notifying the requesting entity of an alternative command to be performed on the resource. An advantage is provided in that the requesting entity is guided by the system through a procedure within their authorization level. If a procedure requires a command to be performed which is outside a requesting entities authorization level, the requesting entity is either notified of an alternative command to try, or alternatively, the command is transferred to a work queue for the attention of another requesting entity that has the appropriate authority level.

Advantageously, the method provides for initiating a user session on receipt of a command being received from the requesting entity and logging each received command in a data store from the requesting entity. Thus, each command that is entered into the system by the requesting entity, is tracked and stored, such that, further analysis may be performed to continually optimize the most appropriate command which is to be notified to the requesting entity for entering into the system.

Viewed from a second aspect, the present invention provides an operational firewall for controlling access to resources within an IT system, the IT system receiving a plurality of commands from a requesting entity, each command requesting access to a resource in order to perform a function, the operational firewall comprising: a context manager for identifying an authority level for the requesting entity and determining means for determining at least one characteristic for each of the received commands; a controller component for determining a relationship between the received command, the or each determined characteristic and the requested resource, and means for determining the effect of the received command being performed on the resource, for each received command; the controller component assigning a status to the received command, in dependence of the effect of performing the received command on the requested resource being determined; the controller component comparing the identified authority level with the assigned status of the command to determine whether the requesting entity has an appropriate authority level to perform the function requested by the received command; and in dependence of the comparing step, the context manager granting or denying access to the requested resource.

Viewed from a third aspect, the present invention provides a computer program product loadable into the internal memory of a digital computer, comprising software code portions for performing, when said product is run on a computer, to carry out the invention as described above.

FIG. 1 shows a schematic representation of a prior art information technology (IT) system. An IT system comprises a number of resources, namely, but not restricted to, a client device 135, a network 130, an application server 125, a critical system 105, intranet applications 110, a network firewall 115 and Internet applications 120. As is known in the art, operation consoles 100 are deployed to monitor, manage and maintain any one of a number of resources which is determined to be part of the IT system. For example, if an application server malfunctions, an operator working remotely from the physical location of the application server 125 can access the malfunctioned application server 125 by logging onto to the application server 125 via the operation console. Once the operator logs onto the operation console 100 and by accessing various software applications, an operator is able to view the resources forming the IT system and perform a number of operations in order to perform a necessary function on a resource, for example, determining the fault of a malfunctioning application server 125. These functions may be as simple as viewing the current status of a resource or performing a number of tasks in order to rectify a fault.

In the example embodiment of FIG. 1, an operator enters commands into an application interface of an operation console 100. The application interface may be a graphical user interface or alternatively, a command line interface. The operation console 100 may comprise a plurality of applications for accessing and managing a number of IT resources. The operation console 100 may be any type of device and is not limited to traditional standalone console, but may also comprise, personal digital assistant (PDA), application specific devices and other hand held devices or mobile devices. The operation console 100 communicates with resources over a network 130. The network 130 may form a local area network, a wide area network, or alternatively, a network, such as, a company specific Intranet or the Internet. The operational console 100 may communicate with the resources over the network 130 by using a protocol, such as, HTTP or preferably, using a secure communication protocol, such as secure HTTP, to ensure integrity of the IT system.

The operator may enter a variety of commands into the interface of the operation console 100 to request access to a resource in order to perform a number of functions. A resource may take the form of, for example, accessing a critical system 105, requesting access to an application server 125, accessing a company intranet application 110 or accessing a firewall 115 to gain access to the Internet 120. Each of these resources may have other hardware and software resources associated with them, for example, a server has a plurality of hard drives, network adapters and router etc. Each resource may have a plurality of commands available to a suitably authorized operator. Depending on the level of granularity adopted, each of these resources can be viewed, accessed and maintained through the applications and the graphical user interface of the operation console 100.

On receipt of an entered command the operation console 100 displays a procedure to be performed pertaining to the requested accessed resource and a number of prompts to inform the operator what tasks should be performed next. The operator in response to the displayed prompts or based on his/her own knowledge may enter further commands into the operation console 100 and view further responses etc.

In order to determine and dynamically bind operator access rights to resources and in turn only allow an operator to perform a task that they have the required level of authority, an operational firewall 200 is provided. This is discussed with reference to FIG. 2.

Figure 2:
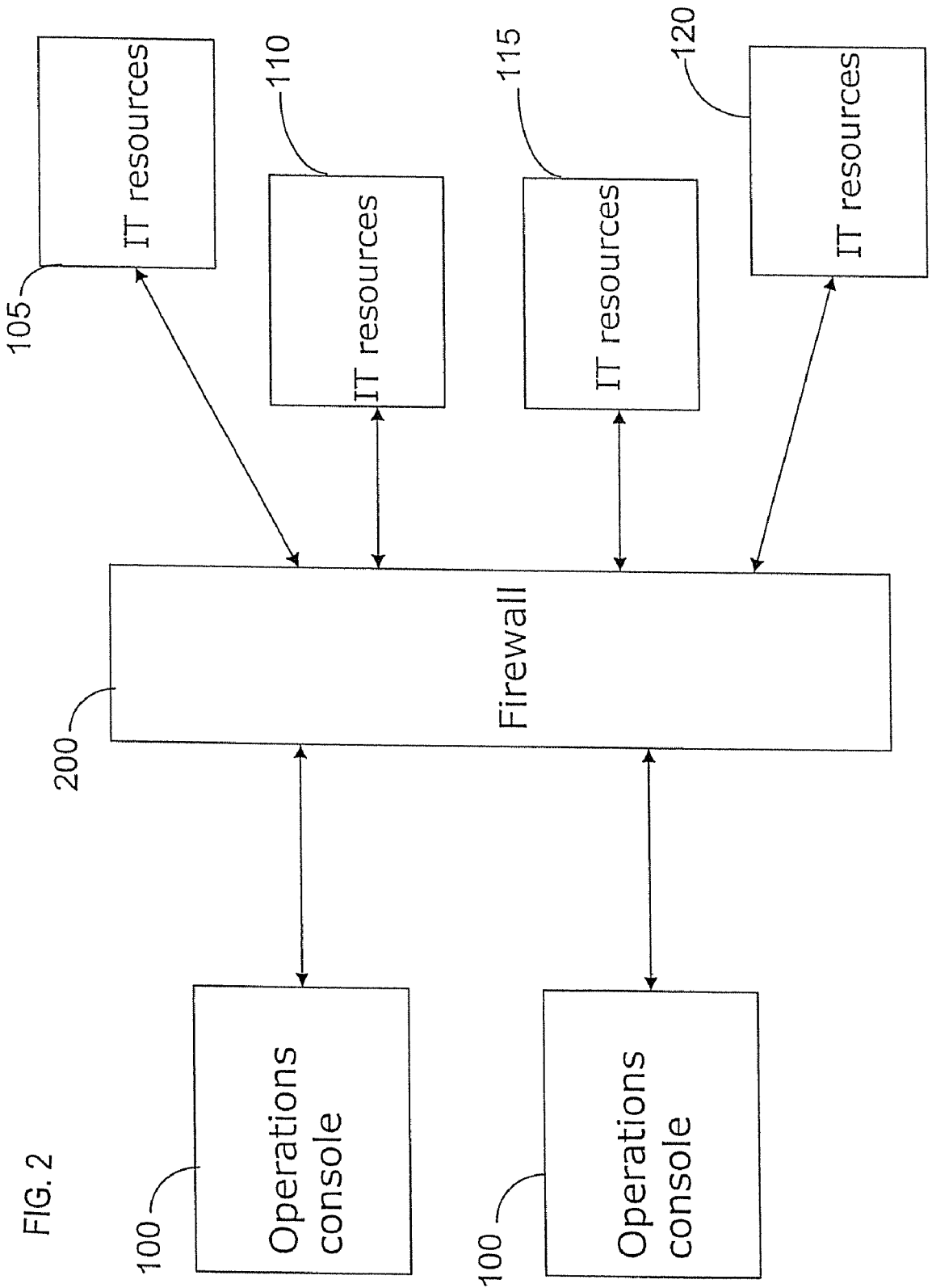
FIG. 2 shows a schematic illustration of the IT infrastructure of FIG. 1, in accordance with embodiments of the present invention.

An operational firewall 200 intercepts commands entered into the operational console 100 by an operator. On receipt of a command, the operational firewall 200, intercepts the command by accessing profiles and rules to map the command to a resource and determine if the operator has the appropriate access rights in order to perform the requested function. The operational firewall 200 in FIG. 2 is shown positioned between two operation consoles 100 and a number of resources 105 to 130. It will be appreciated by a person skilled in the art, that other positional arrangements may be sought without departing from the scope of the invention. The operational firewall 200 may be accessed via a network 130. The network 130 may be a secure network or an insecure network, depending on the particular IT systems infrastructure deployed. The network 130 may comprise a local area network, a wide area network or any other such type of suitable network 130. The operational firewall 200 may be developed using any suitable programming language. For example, any programming language suitable for building systems for managing and manipulating profiles and rules, such as Java and the manipulation of data stored in a number of data stores, for example a database product, such as, IBM's DB2. The operational firewall may be implemented on a middleware platform such as Linux, deploying an IBM e-Server, for example.

Figure 3:
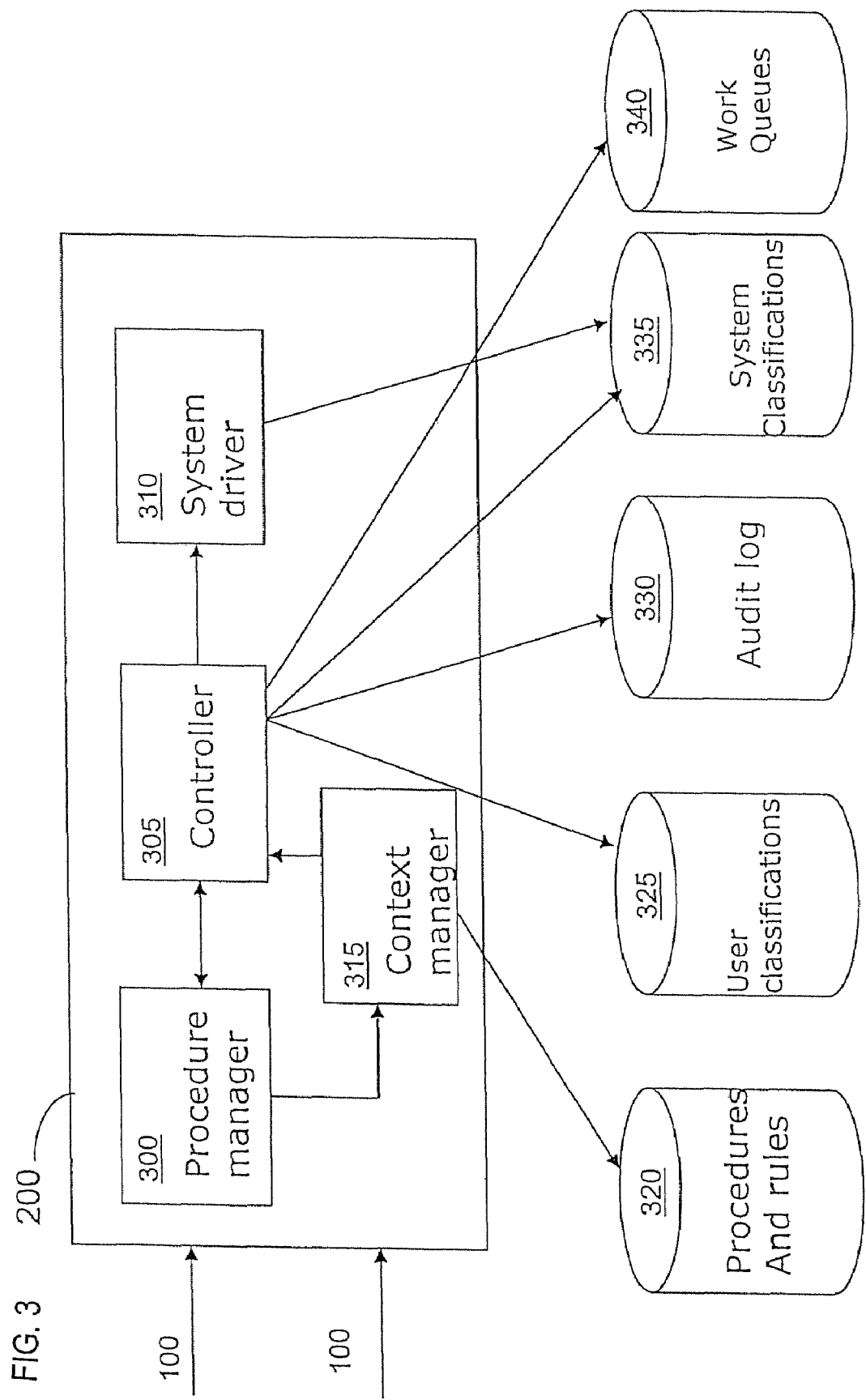
FIG. 3 illustrates a component diagram illustrating the individual components of an operational firewall, in accordance with embodiments of the present invention.

Moving onto FIG. 3, the components of the operational firewall 200 are shown. The operational firewall 200 comprises a procedure manager 300 for processing commands entered into an operational console 100 by an operator, a controller 305 for controlling access to the resources, a context manager 315 for maintaining the state of an operators session and the history of the tasks performed within a procedure and a system driver 310 for translating commands received by the operational firewall 200 from an operation console 100 and also providing the appropriate interfaces for managing the resources.

The procedure manager 300 receives, manages and processes the commands received from the operational console 100. An operator logs onto the procedure manager 300 via the operation console 100. The procedure manager 300 provides a graphical user interface for allowing an operator with the appropriate access rights to perform procedures forming work management tasks, such as, initiate the start of a new procedure, suspend a current procedure, assign a current procedure to another work queue and view a work queue etc.

A procedure may be defined as a number of tasks that are required to be performed in a particular order, to enable the task to be completed correctly. This can be characterized as a workflow through a procedure. For example, in order to complete a task D, a procedure may state that sub task A, followed by sub task B and sub task C must be performed one after the other. If the tasks are completed in any other order, the result will be unsatisfactory or may have disastrous consequences. Depending on the response from sub task B it may be necessary to switch to a different procedure.

The procedure manager 300 presents to an operator work instructions for the operator to follow; allowing the entry of procedure related data and showing the results of previous tasks to allow further options to be presented to the operator as the operator works through a procedure.

Each operator may have different levels of qualifications pertaining to different levels of expertise, for example, different levels of skills depending on the type of IT system. Since every operator may have different levels of qualifications and different areas of expertise, such as, different systems types, and different levels of authorization (depending on the level of risk and business criticality), every operator views a different queue of work. The procedure manager 300 tracks each work item and provides means for escalation if high priority work items are not handled within a specified time limit.

The procedure manager 300 communicates with the context manager 320 to transmit to the context manager 320 operator commands, procedure related data for processing and commands received from the operation console directed to a resource that is to be managed.

The context manager 315 receives operator commands, procedure related data and commands for a resource to be managed, from the procedure manager 300. As an operator works through a procedure the current state of an operator's log-on session is maintained. The operator's state comprises the position and history of the current procedure currently being performed, the access authority given, the configuration details of the resource currently being managed and any configuration data associated with the managed resource, for example, an associated server, hard disk drives, network nodes, and the managed resource's business criticality classification, for example, high, medium or low.

When determining and managing the state of the operator's current log-on session the following information is ascertained:

The level of authority of the logged on operator.

The current steps the operator has reached within the procedure.

The previous steps performed within the current procedure, and the procedural data received from a command from the operator.

The previous commands received by the procedure manager 300, the names and types of resources accessed, and results returned.

The ascertained information is used to support access control decisions made by the controller.

The context manager 315 cooperates with a number of data stores to retrieve the following stored information:

Retrieve user profiles and authorities

Retrieve work item from a plurality of work queues, queue work items for other work queues, mark work items in progress, or mark work items as completed.

Retrieve procedures together with associated work instructions and required authorities.

Log activity by the operator together with context information, responses from the accessed resources (for example, no response received from a resource within a time-out period) and decisions from the controller 305.

Retrieve information relating to the accessed resources to map names to resource types and authorization levels, and identify co-dependent resources (such as applications running on a server, peripherals used by a server).

The above information is filtered according to the type of resource being accessed and managed. For example, if there are several different types of command instructions for restarting a server, only the relevant command instruction for the type of server being accessed will be passed to the procedure manager 300.

Determinations are also performed to ensure that two operators do not perform similar procedures on the same system resource concurrently, where interference might result. If this happens, one operator is advised to suspend the work item until a later time period as the accessed resource is currently in use by another operator.

The context manager 315 transmits the operator commands together with the context information to the controller 305 for decisions on whether the command is allowed. The controller 305 receives commands and context from the context manager 315 and determines whether to allow the command. Decisions are based on the following criteria:

The operator's authority level (does the operator have the specific authority to execute that command)

The resource classification (does the operator have the authority to perform this type of command on this type of resource)

The command type (risk classification or other authority required)

The procedure history (where the pre-requisite steps executed successfully, and what was the result?)

Other system-wide parameters (for example: level of acceptable risk, which might vary from day to day, work queue sizes as an indication of workload, performance versus target service levels, any specific over-rides in place)

If the command is permitted, it is forwarded to the relevant system driver 310 and the results are sent back to the context manager 315. If the command is not permitted, a recommended next step is returned to the context manager 315, which might include:

Seek help
Go back to a previous step
Queue the work item for another (higher authorised) operator The controller component 305 operates by building, maintaining and parsing a matrix according to a number of rules. The matrix may comprise the following variables:

User Role
Action or Procedure Step
Resource Criticality for the system or system component (this provides a weighting, where operators have certain weighting levels
Device Class (node type)
Operator authority
Any prerequisites for a given action The matrix is populated by the controller component 305, such that, for a specific role only a subset of commands may be performed based on the business criticality of the device being accesses, and the device class (e.g. AIX server, Windows Server). An example of a populated matrix is shown in Table 1.

TABLE 1

| Action | Resource Criticality | Operator Authority | Pre-requisite |
|---|---|---|---|
| Ping server | Low, Medium | Any | None |
| | High, Business Critical | Medium | None |
| Restart application | Low, Medium, High | Any | Previous successful Ping of server |
| | Business Critical | High | Previous successful Ping of server; Previous unsuccessful attempt to logon; Proof that application is performing abnormally (performance stats) |
| Restart server | Low | Any | Previous unsuccessful Ping of server OR Request from authorized source |
| | Medium, High | Medium | Proof of server not functioning; Agreement from user representatives OR allowed in SLA (e.g. maintenance slot) |
| | Business Critical | High | Agreement from top management OR allowed in SLA &application specific pre-requisites satisfied |

As is shown in the populated matrix of Table 1, there are a number of columns, the first column—detailing the name of the action, the second column—the resource criticality and the third column—any prerequisite action which must be performed before the action is authorized. Other columns can be added representing specific tests and pre-requisites.

Each column is populated with the required information pertaining to an action. For example taking the action 'ping server', the action has a number of resource criticality statuses associated within namely, low, medium and high and business critical. Each resource criticality has an associated operator authority and a definition of a prerequisite action. For example, if the resource criticality is low or medium, an operator with any authority may ping the resource. Further, in this example there is no pre-requisite action that must be performed. Alternatively, if the resource criticality is high or critical, then only an operator with a medium level of authority may ping the resource.

Another example taken from the above matrix of Table 1 is restarting an application. If the application has a resource criticality of business critical, for example, if a banking application needs to be restarted at the bank's busiest time, only an operator with a high level of authority may perform the action. Secondly, in order to be able to perform the function a number of pre-requisites are stated. For example, a previous unsuccessful ping of the server that the application is running on, or a previous unsuccessful attempt to logon to the application and/or statistical proof that the application is performing abnormally.

As the operator progresses through each step of the procedure, the list of available actions pertaining to the accessed resource from the populated matrix is transmitted back to the operational console 100 and the results are displayed to the operator.

The system driver component 310 retrieves configuration data in order to translate operator commands into valid commands for the specific IT resource, and to route the command to the appropriate resource for execution. The system driver component 310 further retrieves logon information so that the system driver component 310 can logon to the managed resource, if required.

The system driver component 310 provides translation of system commands, responses and interface handling to the managed IT resources. A system driver is written for a specific family of resources (such as a Linux system) and encapsulates the specific protocols, syntax and semantics used by that family of resources. The system driver 310 passes through the commands unchanged and handles the communication protocols to the managed resource. Alternatively, the system driver 310 translates from a generic format to the device-specific format. Alternatively, the translation can be performed in a script or agent running directly on the managed resource. For example, an internal command ENABLE SYS35/DISK20E could be translated into an MVS command "v u,20E,,,online" routed to system SYS35.

The system driver 310 component further handles authentication of the operational firewall 200 to the managed resources. Alternatively, other approaches may comprise logging on to a single never-ending session which is used for all commands from all operators, or logging on once for each operator who needs to execute commands on a specific resource. A pool of logon IDs may be managed by the system driver component 310. The system driver component 310 sends commands and receives responses in a protocol and language acceptable to the accessed resource.

The operational firewall 200 further accesses a plurality of storage devices for storing inventory and configuration information, an audit log, user classifications and procedure and rules. Each of the data stores will be explained as follows:

A first data store 320 comprises data pertaining to the procedures and rules used by the context manager 320. The data comprises details of the steps required to complete a procedure, along with work instructions. Each step of a procedure is assigned an authorization level, and the operator must be assigned this authorization level to be allowed to execute the step. This is combined with rules showing under what pre-conditions a particular procedure step can be executed. For example, a procedure might have three steps:

two diagnostic steps (such as testing whether the application responds to a command, or listing the status of a resource), followed by an intervention step (such as restarting the application). The intervention step would have preconditions based on the successful execution of the two diagnostic steps, and perhaps the results of the diagnostic steps.

A second data store 325 comprises user profiles and authorities information. The information further comprises information pertaining to the identity of an operator, such as, user ids and passwords, together with specific authorization levels for each operator which sets the level of access the operator has for specific command types and system types. For example, an operator could have access to all low-risk commands on any system, medium risk commands on all server types (but not network devices) and high risk commands on Unix servers in a specific domain (such as email servers).

A third data store 330 comprises an a log of all activity on the operational firewall 200, including system commands and responses, operator dialogues, choices taken in procedures, and the context when decision were made by the operator or Controller.

A fourth data store 335 comprises system classifications and configuration data. The data comprises a dictionary of all the managed resources together with their type and their configuration details. For example a UNIX server named x1234 is shown as an IBM e-server model xyz, running the Linux operating system version 2.5 together any other software running on the server. The names and authorization levels are stored for all applications, connected peripherals and network connections. This information is used to validate that a particular network connection is managed by a particular server, or that a certain command is valid for this specific level of an operating system.

A fifth data store comprises information pertaining to the work queues for the individual resources. A work queue comprises tasks waiting to be performed by an operator, tasks assigned to a work queue depending on the authority level required to execute the work item. The work item may not have started (for example a request from an end user) or may have been started but incomplete (because the operator was not authorized, or interrupted by a higher priority work item), in which case information is also stored to allow the history and context to be retrieved by the operational firewall.

Figure 4:
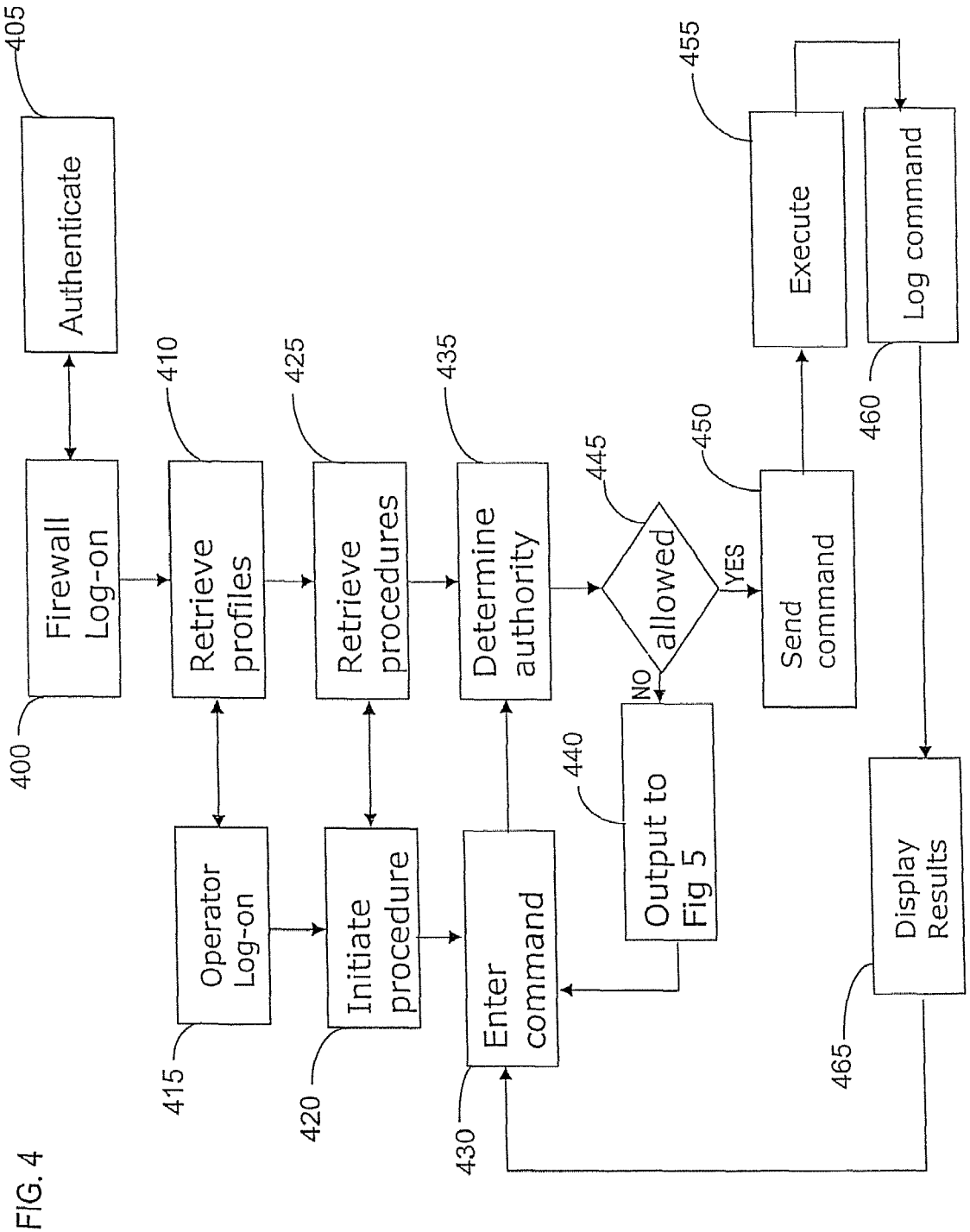
FIG. 4 illustrates a flow chart detailing the operational steps of the operational firewall when providing access to a number of IT resources, in accordance with embodiments of the present invention.
Figure 5:
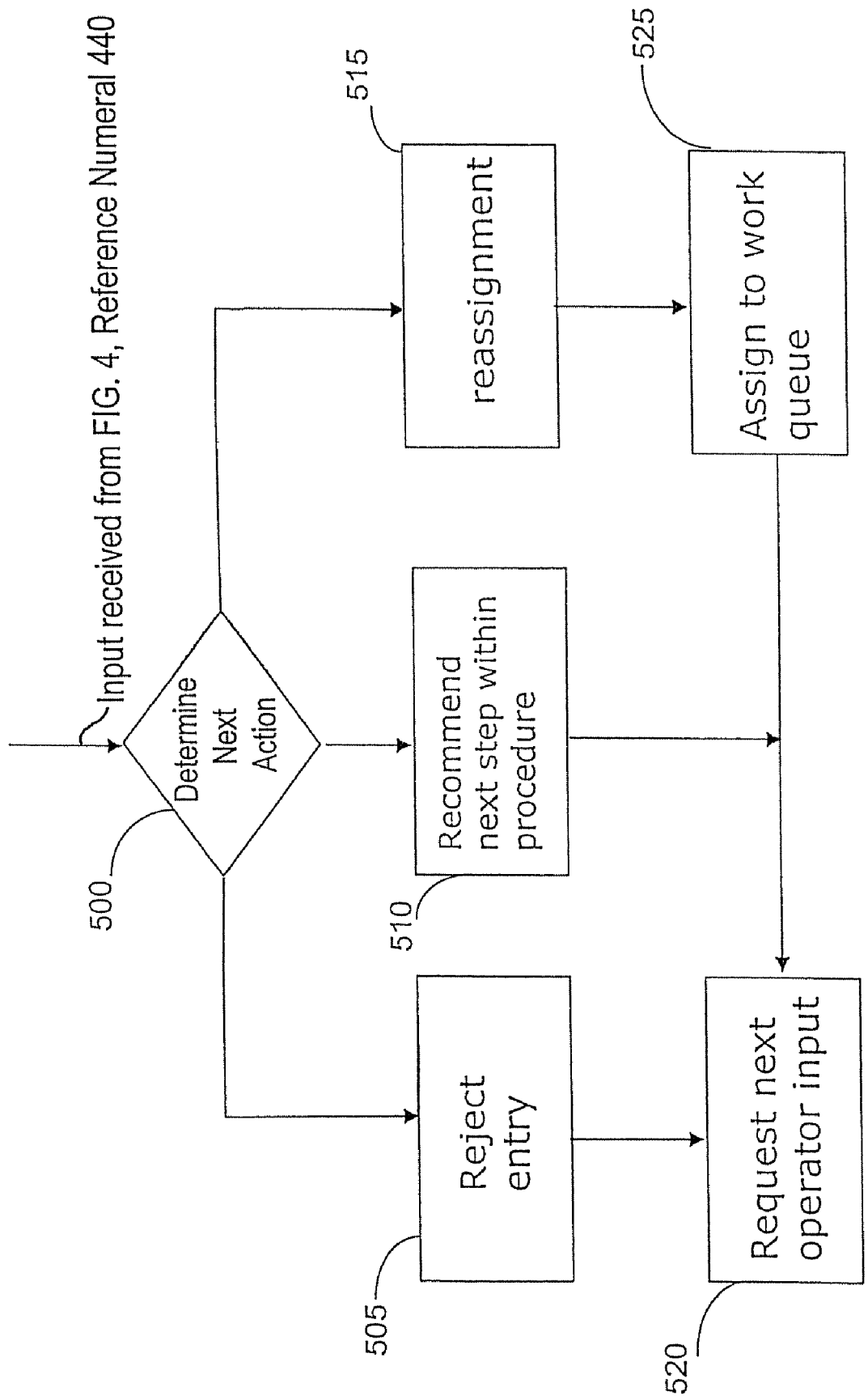
FIG. 5 illustrates a flow chart detailing the operational steps of the operational firewall when restricting access to a number of IT resources, in accordance with embodiments of the present invention.

Moving onto FIG. 4 and FIG. 5, the operational steps of the operational firewall 200 are shown. At step 400, the firewall logs onto a requested resource under the instruction of an operator and the resource being accessed authenticates the firewall at step 405. At step 410, on acknowledgment of an operator logging on to the firewall at step 415, the procedure manager 300 retrieves from the user profile database, the user profile comprising the authority levels for specific command type, and relevant work queue information.

On initiation of a procedure (step 420), for example, a procedure pertaining to an application that is not responding, the procedure manager 300 retrieves the appropriate procedure and prompts the user with a command to be performed at step 425. On receipt of the command (step 430) the controller component determines in step 435 the level of authority required for the requested resource and any identified dependencies of the named resource (as specified within the configuration database 335). On receipt of the prompted command, control passes to the controller 305 and the controller 305 determines in step 445 whether the command is allowed for the operator and the resource at this particular stage within the procedure. If the determination is positive, control moves to step 450 and the command is sent to the accessed resource and at step 455 the accessed resource executes the received command. The command and its result are logged in the audit log at step 460 and the result of the executed command is displayed to the operator via the operational console at step 465.

Moving back to control 445, if the determining step is negative, control moves to step 440 which executes step 500 of FIG. 5 and the controller requests analyses the combination of commands, resource, operator authority level and procedural data to analyze why the command could not be executed and to determine the next action to be accordingly performed. Based on said determination in step 500, the next action is performed in step 505, 510, or 515. If the determination at step 500 determines that it is the command or the resource that was refused, control moves to step 505 and the command entry is rejected and a request is made to request input from a higher skilled operator at step 520. If the determination at step 500 determines that the command was not allowed at a particular stage within the procedure, the controller 305 suggests another appropriate procedural step to be taken by the operator at step 510. If the determination at step 500 determines that the operator does not have the appropriate authority level for being allowed to have the command performed, then the command may be reassigned (step 515) and transferred to a work queue (step 525) for the attention of another requesting entity that has the appropriate authority level for being allowed to have the command performed.

In order to provide a better understand of FIGS. 4 and 5, an example of FIGS. 4 and 5 in operation is presented next:

An operator logs onto the operational firewall 200, using a single sign-on profile accessed from the user profiles database.

A lookup is performed in the procedure database 320 and the work items queue 340 to determine which procedures are authorized and available to the operator. A menu option of the determined procedures and work items are displayed to the user via the graphical user interface of the operation console 100.

On receipt of a command from the operation console 100, for example, a problem report being received, the procedure manager 300 displays a list or procedures available to the operator. If this procedure is the first initiation of the procedure for a resource, the operator is requested to enter the name of the resource to be managed and the context manager 315 performs a lookup within the configuration database to identify the configuration data for the resource to be managed.

An example of the operational firewall 200 in use when responding to a problem report concerning a resource, such as, an application is not responding is as follows:

An operator signs onto the procedure manager 300, using a single sign-on (unique to that operator but allowing access to all suitably authorized IT resources), which is accessed within the user profiles database. The operator is presented with a menu of procedures relevant authority level. On receiving a problem report, for example, a problem report stating that an application is not responding, the operator follows the defined procedure for an application which is not responding. The procedure may be as follows:

The procedure states that the operator must firstly enter a ping command into the operational console 100. The operator enters the application name and a lookup is performed by the context manager 315 to map the entered application name to the logical name of the resource i.e. the application server that the application is residing on. A set of instructions for performing the ping command are displayed to the operator. The set of commands will be different according to the type of resource being managed.

The procedure manager 300 displays the work instruction and allows the operator to enter the command. The command is logged within the activity history database and forwarded by the context manager 315 (with the context) to the controller 305 and a decision is made on whether to allow the command. In this example the command is rated as a non-intrusive command, and the server is rated a medium risk resource and as such, the controller 305 allows the command and passes it to the appropriate system driver. The system driver either signs on to the server for this command or uses an existing long-term session which is signed on at the start of the day/month.

In this example, the server responds to the command and the result is recorded on in the audit log data store and the data is updated. The result is then displayed to the operator.

Next, an attempt is made to log on to the application. Procedure instructions are provided from the procedure database for the relevant application, for example, Lotus Notes. The procedure manager 300 prompts the operator to log in and a sign on is provided by the context manager 315 using data from the user classification data store 325 by the operational firewall 200.

In this example, the entered command (login) is rated as a medium risk in the procedure data store 320 and is determined as a business critical application. In response to this information the controller component 305 identifies the operator's authority level and determines whether the command can be performed by the operator. A further lookup is performed to determine the history (data store 320) of the operator's current session to locate any previous commands and whether the previous commands were successful or not. In this instance it is determined that a previous ping command occurred and that it was successful. In response to the above determined information, the controller 305 determines that the operator does have the correct level of authority and that the login command can go ahead. In response to a previous ping command the further set of procedural tasks are displayed to the operator.

Once the operator has logged on to the application, it is determined that the application is still not responding. The system driver 310 waits for a response within a predetermined time period and if the application does not respond within the timeout period, the result is recorded within the audit log 330 and the data updates within the context manager 315. The result is passed back to the procedure manager 300 for displaying to the operator.

The procedure now states that application should be restarted, but according to the controller 305 the application is classed as business critical. The controller checks that any previous procedure steps have been performed and what the outcome of the procedure steps is. The controller 305 further determines the operator's authority level. In this instance it is determined that the operator does not have the level of authority required to perform the restart command. The controller 305 therefore suggests a recommended action, this may involve additional process steps being invoked, based on the requirements of the procedures database, the type of problem, and the type of resource. These recommendations are presented to the operator by the procedure manager 300 who can then take appropriate action. In this case the likely action would be suspend the procedure and add to the queue for a suitably authorized operator.

On restarting the application by an operator with the appropriate level of authority and the controller 305 is satisfied that all the prerequisites in terms of procedure, operator authority and previous results are met for this resource: grants the access and the system driver provides the specific commands and access to the resource.

If on repeated attempts to log on to application the application still does not respond, the result are recorded again and logged for future problem analysis in case there is an error in the procedures.

If the procedure now requests an operating system restart; the system name is provided by the context manager 315 using data from the configuration data store 335, but, in this instance, the system restart command is beyond the authority level of the current operator and has to be queued to another user to perform.

The context is saved in the work queue database for subsequent review by the new operator and the problem report may be re-routed to a different operator for resolution.

The operator returns to main menu of the procedure manager 300, and their personal context in the context manager 315 and access rights are reset.

What is claimed is:

1. A computer program product loadable into an internal memory of a digital computer, said computer program product comprising software code adapted to be executed on said digital computer to perform a method for controlling access to resources within an information technology (IT) system in conjunction with executing a procedure that defines a plurality of commands, said method comprising:

receiving the plurality of commands from a requesting entity, each command requesting access to an associated resource in order to perform a function;

identifying an assigned authority level of the requesting entity;

determining at least one required authority level of the requesting entity for each command in order for the requesting entity to be granted access to the requested resource associated with said each command, said at least one required authority level for each command being determined as a function of said each command and a resource criticality classification of the resource associated with said each command;

granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

denying the requesting entity said requested access if a determination has been made that each condition of said at least one specified condition has not been satisfied.

2. The computer program product of claim 1, said at least one condition not further comprising a condition of a specified prerequisite action having occurred prior to said receiving said each command.

3. The computer program product of claim 1, said at least one condition further comprising a condition of a specified prerequisite action having occurred prior to said receiving said each command.

4. The computer program product of claim 1, said receiving having occurred at a particular stage of the procedure, said at least one condition not further comprising a condition of said each command not being allowed to be performed at said particular stage of the procedure.

5. The computer program product of claim 1, said at least one condition further comprising a condition that is a function of a risk classification of said each command.

6. The computer program product of claim 1, wherein upon said denying access to the resource, said method further comprises generating an alert notifying the requesting entity of an alternative command or sequence of commands to be performed on the resource associated with each command.

7. The computer program product of claim 1, wherein each command has been placed in a work queue of the requesting entity, and wherein upon said denying access to the resource associated with said each command said method further comprises transmitting said each command to an alternative work queue for an attention of an entity with a higher assigned authority level than the assigned authority level of the requesting entity.

8. The computer program product of claim 3, said specified prerequisite action being a function of said resource criticality classification.

9. The computer program product of claim 3, said specified prerequisite action comprising a successful or unsuccessful response from an action on a resource in the IT system.

10. A computer system for controlling access to resources within an information technology (IT) system in conjunction with executing a procedure that defines a plurality of commands, said computer system comprising internal memory that stores software code therein, wherein execution of said software code by said computer system implements a method comprising:

receiving the plurality of commands from a requesting entity, each command requesting access to an associated resource in order to perform a function;

identifying an assigned authority level of the requesting entity;

determining at least one required authority level of the requesting entity for each command in order for the requesting entity to be granted access to the requested resource associated with said each command, said at least one required authority level for each command being determined as a function of said each command and a resource criticality classification of the resource associated with said each command;

granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

denying the requesting entity said requested access if a determination has been made that each condition of said at least one specified condition has not been satisfied.

11. The computer system of claim 10, said at least one condition not further comprising a condition of a specified prerequisite action having occurred prior to said receiving said each command.

12. The computer system of claim 10, said at least one condition further comprising a condition of a specified prerequisite action having occurred prior to said receiving said each command.

13. The computer system of claim 10, said receiving having occurred at a particular stage of the procedure, said at least one condition not further comprising a condition of said each command not being allowed to be performed at said particular stage of the procedure.

14. The computer system of claim 10, said at least one condition further comprising a condition that is a function of a risk classification of said each command.

15. The computer system of claim 10, wherein upon said denying access to the resource, said method further comprises generating an alert notifying the requesting entity of an alternative command or sequence of commands to be performed on the resource associated with each command.

16. The computer system of claim 10, wherein each command has been placed in a work queue of the requesting entity, and wherein upon said denying access to the resource associated with said each command said method further comprises transmitting said each command to an alternative work queue for an attention of an entity with a higher assigned authority level than the assigned authority level of the requesting entity.

17. The computer system of claim 12, said specified prerequisite action being a function of said resource criticality classification.

18. The computer system of claim 12, said specified prerequisite action comprising a successful or unsuccessful response from an action on a resource in the IT system.

19. An operational firewall for controlling access to resources within an information technology (IT) system in conjunction with executing a procedure that defines a plurality of commands, said operational firewall comprising:

a procedure manager for receiving the plurality of commands from a requesting entity, each command requesting access to an associated resource in order to perform a function;

a context manager for identifying an assigned authority level of the requesting entity;

a controller component for determining at least one required authority level of the requesting entity for each command in order for the requesting entity to be granted access to the requested resource associated with said each command, said at least one required authority level for each command being determined as a function of said each command and a resource criticality classification of the resource associated with said each command;

means for granting the requesting entity said requested access to the resource associated with each command if a determination has been made that each condition of at least one specified condition has been satisfied, said at least one specified condition being specific to each command, said at least one specified condition comprising a condition of the assigned authority level matching or exceeding an authority level of the at least one required authority level of said each command;

means for denying the requesting entity said requested access if a determination has been made that each condition of said at least one specified condition has not been satisfied.

20. The operational firewall of claim 19, said at least one condition further comprising a condition of a specified prerequisite action having occurred prior to said receiving said each command.

21. The operational firewall of claim 19, said at least one condition further comprising a condition that is a function of a risk classification of said each command.

22. The operational firewall of claim 19, wherein upon said denying access to the resource, said procedure manager is adapted to generate an alert notifying the requesting entity of an alternative command or sequence of commands to be performed on the resource associated with each command.

23. The operational firewall of claim 20, said specified prerequisite action being a function of said resource criticality classification.

24. The operational firewall of claim 20, said specified prerequisite action comprising a successful or unsuccessful response from an action on a resource in the IT system.

* * * * *